June 7, 1955     D. J. PRITCHARD     2,710,113
SEAL CONSTRUCTION
Filed Jan. 23, 1952     2 Sheets-Sheet 1
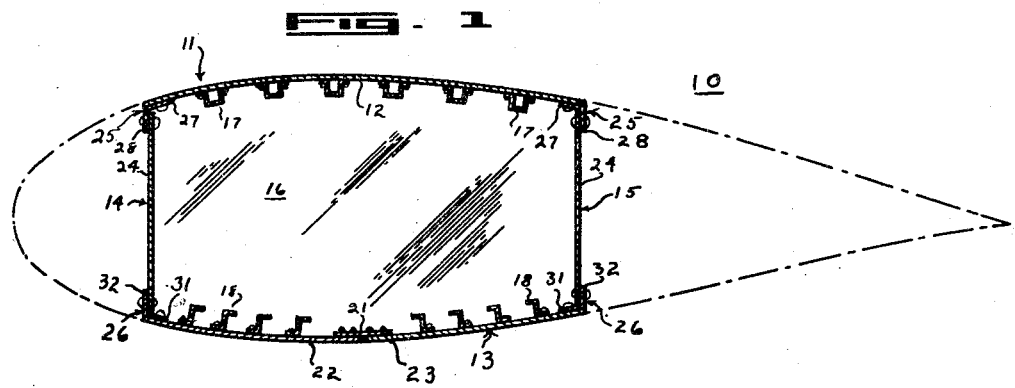
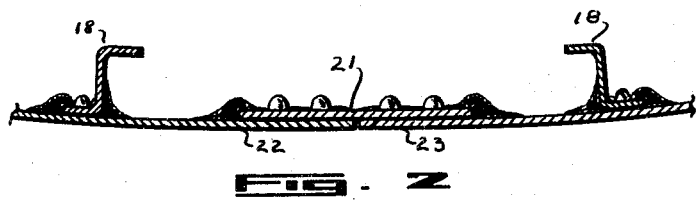
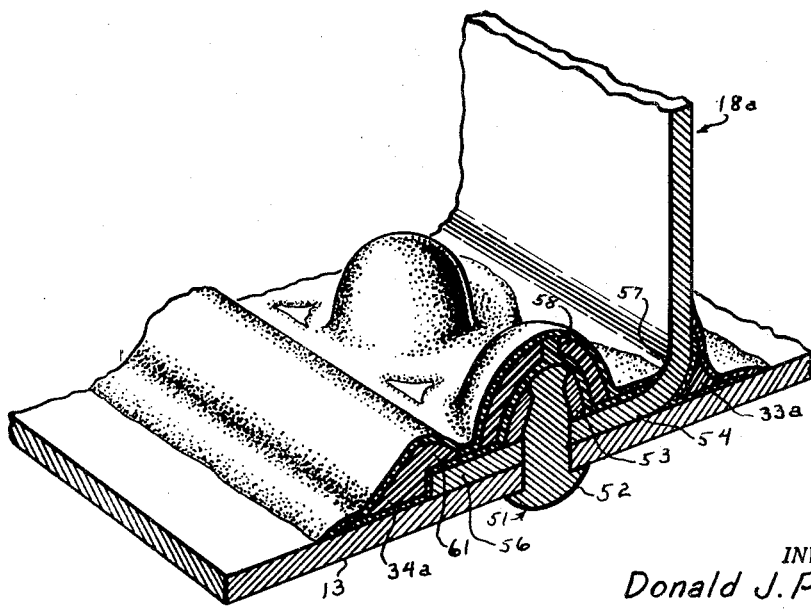
INVENTOR:
Donald J. Pritchard
BY Walter J. Jason
ATTORNEY June 7, 1955   D. J. PRITCHARD   2,710,113
SEAL CONSTRUCTION Filed Jan. 23, 1952   2 Sheets-Sheet 2

*INVENTOR:*
*Donald J. Pritchard*
BY *Walter J. Jason*
*ATTORNEY*

2,710,113

SEAL CONSTRUCTION

Donald J. Pritchard, Fort Worth, Tex., assignor, by mesne assignments, to General Dynamics Corporation, a corporation of Delaware Application January 23, 1952, Serial No. 267,719

8 Claims. (Cl. 220—81)

The present invention relates to sealing of containers and more particularly to providing a novel form of seal construction having particular use in the leak-proofing of enclosed areas wherein structural members are employed, such as integral type fuel tanks, sponsons, flying boat hulls and the like.

Integral aircraft fuel tanks are usually formed by utilizing structure required in the normal construction of an airplane. For instance, in the formation of a wing tank, portions of the upper and lower surfaces of the wing, together with wing spars and end bulkheads present in the wing are combined into a tank housing. Integral tanks have also been formed in other portions of the airplane, such as in a sponson, fuselage, flying boat hull or the like utilizing the structural elements normally present therein. To effect a liquid-tight enclosure from these structural elements, it is necessary to seal all areas within the integral housing where leakage might occur with a suitable sealant material, which sealant material will be impervious to gasoline if the integral housing is to be used for liquid fuel storage, or which material will have at least the capacity to resist the solvent action of water if it is desired merely to render leak-proof an integral housing, such as a sponson or flying boat hull.

Customarily a sealed structure is attempted by the use of gaskets or a rubber-like sealant between the faying surfaces of the structural components, by the application of sealant over the heads of the rivets, nuts, bolts, or other fasteners employed, and by providing a sealant coating over the edges of the various seams present in the structure of the housing. Further, it has been usual in this method of sealing an enclosure to apply the uncured rubber-like sealant in paste, putty or liquid form at the desired locations with a brush, spatula, spray gun, filleting gun or by fill and drains; however, to achieve the necessary thickness of sealant which will afford an effective seal it has been found necessary to apply the sealant in successive coats with lengthy cure periods of many hours duration between each coating. This method of sealing, in addition to consuming an inordinate amount of time is also subject to workman errors which often results in development of fuel leaks. Further, with the customary methods employed to seal an enclosure, there is no assurance that a uniform thickness of seal will be obtained, and a lack of uniformity of sealant thickness generally has a deleterious effect on the capacity of the tank to withstand fuel leakage since those areas where the sealant may have been applied too thinly are subject to rapid diffusion or penetration by the fuel contents of the tank and as a consequence leakage will result.

It is also a common fault of sealed areas produced by the usual methods known to the art that there will be voids or air pockets present in the sealant which will cause expansion and an eventual breaking of the sealant when elevated temperatures or high altitudes are encountered.

A sealant characteristic which renders it difficult to achieve a good seal rapidly and effectively by known methods is the propensity of liquid type sealants to slump. Because of this tendency to slump, or run off, it is extremely difficult for a workman to obtain the required thickness for sealing without resorting to a large series of applications of the sealant and the expenditure of a good deal of time, patience and effort.

The primary object of the present invention, therefore, is to avoid the above difficulties by providing a simplified and novel procedure for effectively sealing the required areas of an enclosure such as an integral fuel tank flying boat hull, sponson and the like.

Another object of the invention is to provide a novel means for effecting a desired thickness of seal with a minimum of effort.

Another object of the present invention is the provision of an improved sealing construction for achieving a leak-proof enclosure which involves the use of preformed elements molded to shapes dictated by the configurations of structural elements being sealed.

Another object of the invention resides in employing a sealing construction wherein air entrapment is substantially obviated.

Another object of the invention lies in the provision of an improved method for sealing an enclosure which is not affected by any tendency to slump of the sealant.

A further object of the invention is to provide a leak-proof seal for an integral fuel tank which seal is adapted to withstand stresses and strain occasioned by expansion and contraction of the tank or general flexure of the structure of the tank.

A still further object of the invention is to provide a novel method of leak-proofing an integral housing the steps of which are simple and readily performed, and which is particularly characterized by its economy and speed, and by the ruggedness and effectiveness of the seal produced.

Other objects and features of the invention will be readily apparent to those skilled in the art from the following specification and appended drawings illustrating a certain preferred embodiment of the invention in which:

Figure 1 is a cross-section of a typical integral tank construction embodied in an airplane wing and to which the present invention may be applied.

Figure 2 is an enlarged fragmentary sectional view illustrating a portion of the integral tank and showing the structural components thereof sealed in accordance with the present invention.

Figure 3 is an enlarged perspective view in cross section of the sealing means of the present invention as applied to a structural member of the integral fuel tank.

Figure 4:
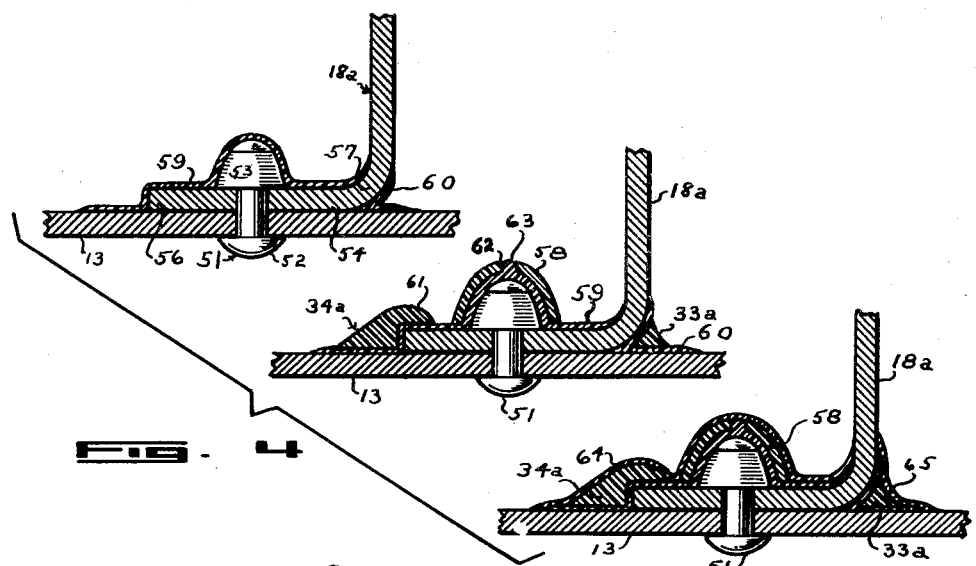
Figure 4 illustrates various stages in the sealing of a structural member.

Having reference now with greater particularity to the drawings, there is illustrated, partially in broken line form, in Figure 1 a section of a usual wing which is indicated generally by the numeral 10. Embodied in wing 10 is a typical integral type fuel tank shown generally at 11 formed of the usual structural elements provided in the construction of wing 10. The fuel tank 11 is defined by and constituted of, as shown, a portion 12 of the upper wing or skin surface which forms the upper wall of the fuel tank, a portion 13 of the lower wing or skin surface which comprises the bottom of the tank, a front spar 14 and a rear spar 15 which effect front and rear walls of the tank, and two laterally spaced ribs 16, only one of which is shown, which afford the side walls needed to complete the enclosure. The various members comprising the walls of the tank 11 are, of course, imperforate except for the usual rivet and bolt holes provided for attachment purposes. Usual and typical strengthening elements are afforded the tank construction, such as hat-section members 17 extending longitudinally of the wing and riveted or otherwise suitably secured to portion 12 of the upper wing surface, and longitudinally extending Z-section members 18 secured as by riveting to portion 13 of the lower wing surface.

Breaks in the continuity of a wing surface are cared for as by the use of a plate member 21 which interconnects adjoining wing panels, shown at 22 and 23, and is secured to the panels by suitable rivets. Plate member 21 overlies the space between.

Front spar 14 and rear spar 15 each comprises a vertically extending web 24 whose upper and lower edges are connected respectively to the upper and lower wing portions 12 and 13 by upper and lower angle bars 25 and 26. Upper angle bars 25 consist of horizontal legs 27, which are affixed by rivets to the underside of upper wing portion 12, and vertical legs 28, which are riveted to webs 24 of spars 14 and 15. Lower angle bars 26 have horizontal legs 31 secured by rivets to the inner side of lower wing portion 13 and vertical legs 32 attached by rivets to webs 24 of spars 14 and 15.

It will be understood, of course, that the integral fuel tank construction described hereinabove is representative only, and that this particular construction was selected merely for purposes of illustrating a use of the seal of the present invention. The invention contemplates the sealing of any usual enclosed area utilizing the normal structure present in an aircraft, which enclosed area may be an integral fuel tank, a sponson, boat hull or like construction. The present sealing method and means is not confined to use with an integral housing of any specific shape or design, or to use with a particular combination of structural components.

After the integral wing tank 11 has been built up in the manner described it is then necessary to seal the various seams, joints and fasteners therein to effect a leak-proof container. To effectively seal the tank 11 the present invention utilizes a preformed element at each location where leakage can occur. Essentially the preformed elements will assume one of two basic shapes to accommodate sealing conditions which are customarily encountered. One of these shapes will assume the form of a cap, and the other the form of a fillet. A preformed element having the shape of a cap will be employed in connection with rivets, bolts, nuts, nut-plates, screws and like fasteners used to hold metallic structural members in assembled relation and which project into or are present within the interior of the housing. A preformed fillet will be located at all seams, edges and joints where structural elements meet to assist in preventing leakage therethrough.

Figure 5:
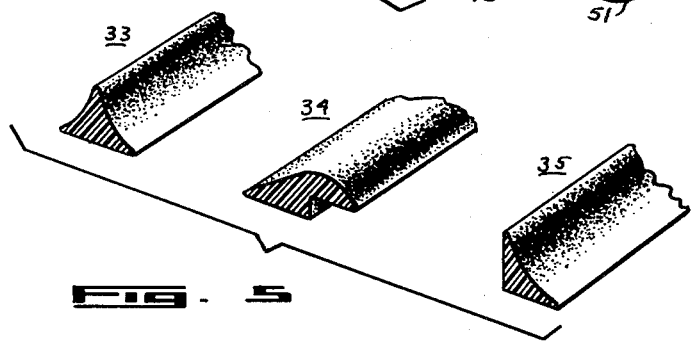
Figure 5 illustrates typical pre-formed fillets usable in the present invention.

The particular configuration assumed by a cap or fillet is dependent on the configuration of the part or juncture at which sealing is required. Figure 5 is illustrative of three typical fillets 33, 34 and 35 that may be employed in connection with edges, seams and like conditions to be sealed.

Figure 6:
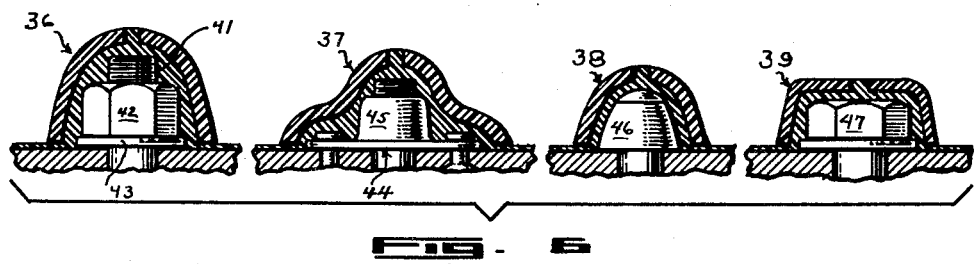
Figure 6 illustrates sealing of various shaped fastener elements in accordance with the invention.
Figure 7:
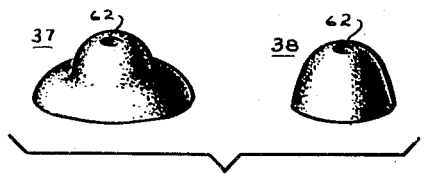
Figure 7 illustrates typical preformed sealing caps contemplated by the present invention.

Figure 6 shows four configurations of caps which are generally indicated by the numerals 36, 37, 38 and 39 disposed in operative position relative to various type fasteners which may be employed. It is noted that in each instance the specific shape assumed by a cap is dependent on the particular sealing problems presented by a fastener. Cap 36 has a configuration which best adapts it to enclose the end of a bolt 41 having a nut 42 and washer 43 disposed thereon; cap 37 has a shape which best accommodates a nut plate 44 and a fastener 45 carried thereby; the shape of cap 38 adapts it to enclose a rivet head 46; and cap 39 is afforded a flattened top to conform to the shape of a bolt head 47 enclosed by it. It is obvious, therefore, that the specific shape provided a cap is not a limitation upon the present invention. It is here noted that a cap must be of sufficient size to closely surround a fastener yet not touch it. The purpose of providing a gap between the interior walls of a cap and the contained fastener will be described hereinafter.

A cap may be made of any suitable material which will resist the solvent action of water and is unaffected by liquid fuels, this material may be metal, plastic, synthetic rubber or the like. The wall thickness of a cap should be sufficient to afford some rigidity thereto to permit ready handling thereof without distortion. As no undue loads will be applied to a seal, this thickness may be relatively small, as for example, about $3/32$ of an inch if the cap were made of synthetic rubber, or about $1/32$ of an inch if metal were employed.

Caps and fillets are employed to assure that a proper thickness of sealing material is provided at the required locations and that an effective seal is produced. The manner in which caps and fillets enter into the sealing operation will be described in connection with Figures 3 and 4. Figure 3 is illustrative of a typical construction encountered in an integral type fuel tank and Figure 4 illustrates various steps in sealing such construction.

In Figure 3 a strengthening member 18a is shown affixed to the lower wing portion 13 by conventional high shear rivet assemblies 51. Each rivet assembly 51, as shown, comprises a rivet pin 52 having a collar 53 cooperating with it to attach flange 54 of member 18a to wing portion 13. To effect a seal about member 18a in the area where it is mounted to wing portion 13 there is afforded a first fillet 34a adjacent edge 56 of flange 54, a second fillet 33a is positioned at the seam formed at the radius 57 of member 18a, and a cap 58 is placed over each rivet collar 53. It is noted that fillet 34a has a shape which includes a projecting portion 61 for overlapping flange 54 and that fillet 33a is of generally triangular shape, each, thus, having a shape which best accommodates the juncture it is to seal, and which will best assure that a leak-proof seal will be secured.

Before the various fillets and caps are placed in position the areas to be sealed are first coated with a sealing compound which acts to cement the fillets and caps in place. Any suitable sealing compound which is resistant to attack by liquid hydrocarbon fuels and which is unaffected by water may be employed. Such materials are readily commercially available and are generally known in the art as synthetic rubber forming compounds. Suitable compounds, among others, are produced under the trade names of "Thiokol" and "Neoprene."

"Thiokol" is a designation of the Thiokol Corporation for organic polysulphide polymers produced by it. These polymers are particularly noted for their unique solvent resistance, they are widely used in those places where resistance to gasoline, kerosene, fuel oils and lubrication oils is a requirement. U. S. Patents 2,142,144, 2,206,643, 2,216,044, 2,221,650 and 2,402,977 describe organic polysulphide polymers which may be utilized.

"Neoprene" is a plastic polymer of chloroprene, and may be prepared by polymerizing chloroprene as set out in U. S. Patent 1,950,436.

In addition to the above named sealants such hydrocarbon resistant synthetic rubbers as Buna-N or butadiene-acrylonitrile copolymer rubbers may be employed. Butadiene-acrylonitrile copolymer rubbers are commercially available under the trade names "Hycar OR" and "Chemigum." "Hycar OR-15" is a product of the Hycar Chemical Co. and contains about 60% by weight of butadiene and 40% by weight of acrylonitrile. "Hycar OR-25" is a synthetic rubber which is also readily obtainable and differs from "Hycar OR-15" in that it has a slightly lower percentage of acrylonitrile. "Chemigum"

is a product of Goodyear Tire and Rubber Co. and identifies synthetic rubbers of the 70–30 butadiene-acrylonitrile copolymer type and 80–20 butadiene-acrylonitrile copolymer type.

It is understood that the synthetic rubbers above discussed are merely representative of sealants that may be employed in the present invention. The invention is not intended to be limited to the specific composition of any particular hydrocarbon resistant sealant. Any synthetic rubber which is capable of resisting the effects of hydrocarbon fuels and which may be cured or vulcanized in place is contemplated for use.

As was hereinabove stated, the first step in the sealing process is the application, as by brushing, of a suitable uncured hydrocarbon resistant sealant to form a coat or layer at those areas where leakage might occur. In Figure 4 which illustrates a typical sealing operation, this coating is indicated generally by the numerals 59 and 60. The caps and fillets may now be installed in place and the sealant then cured in the usual manner to fix the preformed caps and fillets in position. To assure that there is a complete filling of the gap between the interior walls of a cap element and the fastener it is to enclose, a quantity of the same uncured sealant is included within the cap itself before it is fitted over the fastener. It is noted that each cap element is provided with an opening 62 in its top. This opening permits excess sealant present beneath the cap to exude, as shown at 63 in Figure 4, when the cap is pressed into place. This procedure not only provides an effective seal between the cap and fastener but prevents entrapment of air.

After the step of affixing or cementing the caps and fillets in place a coating of the fuel resistant sealant is next applied, as by brushing, over the various molded parts and this coating is then cured. This final coating, indicated generally in Figure 4 at 64 and 65, assures that an effective seal is provided at the required areas.

While, as was stated hereinbefore, the caps and fillets could be constructed of a variety of materials, impervious to the solvent action of water and liquid fuels, such as metal, plastic, and the like, in the preferred form of the invention the caps and fillets will be made of fuel resistant synthetic rubber, and the synthetic rubber employed in the first sealant layer, and in the final coating will preferably be the same as that used which is employed in the formation of the cap or fillet. By utilizing the same material for each, it is thereby possible to achieve a homogeneous seal of a desired thickness much more readily than could possibly be obtained by building one up by means of a series of layers. The thickness of the cap or fillet will substitute for laboriously produced layers which ordinarily would be required.

Another method of effecting the desired sealed condition for a tank or other structure to be made leakproof, which is equally suitable to the method above described, consists of, as in the first method, applying the uncured sealant, as by brushing or in any other usual manner, at the various areas to be sealed. This coat, however, is cured before the caps and fillets are put in place. After the curing operation the various molded caps and fillets are then properly located, with the caps being provided with a quantity of the uncured sealant before being fitted over the part to be sealed. The sealant in a cap will assure the complete filling of the space surrounding the fastener being sealed. Excess sealant will be forced through the opening in the cap and is scraped away.

After the positioning of the fillets and caps a coating of the uncured sealant is brushed, or otherwise applied, thereover, again as in the first method, and curing of the sealant is then effected to achieve the desired seal.

Again, it is preferred that the caps, fillets, first layer, filling, and last coating all be composed of the same fuel resistant synthetic rubber in order that a seal of homogeneous construction be effected. Though seals employing caps and fillets made of metal or plastic result in good seals, the best seals are those which are of homogeneous construction and most aircraft applications, in accordance with government specifications, require homogeneous seal constructions.

The specific manner of effecting curing or vulcanizing of the uncured sealant in the methods above described forms no part of this invention. The usual methods of vulcanization or curing well known to rubber technologists will be employed giving due consideration to the physical and chemical characteristics of the particular sealant being used.

Sealing an integral type fuel tank or any other structure against fluid leakage, in accordance with the present invention, by utilizing molded caps and fillets and applying a sealant coat both beneath and over these elements produces highly effective seals in all those areas where leakage might occur.

The materials utilized in the present invention are readily commercially available. The caps and fillets, as has been stated, are preferably formed of synthetic rubber, though metal, plastic or any material having resistance to the effects of hydrocarbon fuels might be employed and good seals obtained. They are molded or formed into the desired shapes utilizing conventional manufacturing processes. The particular size and configuration assumed by each of the prefabricated caps and fillets used is, of course, dependent on the size and shape of the fastener to be enclosed and the type of joint or seam to be sealed.

It is obvious that use of caps and fillets as components of seals will materially reduce the time and labor required to develop a seal of proper thickness to leakproof a joint, seam, fastener or other area to be sealed. It is unnecessary to painstakingly build up a seal by a large succession of coatings with attendant loss of time because of the necessity to cure each coat before a succeeding coat is applied. Cementing and sealing a cap or fillet in place clearly can be accomplished much more rapidly than could a seal of comparable thickness be built up by use of a brush, spatula, or other application method.

The quality of the seal obtained in the present invention is superior to the seal produced only by a succession of sealant coats. A seal of uniform thickness (which provides for better weight control) is clearly more readily obtainable by the use of a molded element and inadvertent occurrence of thin sections susceptible to washing away or penetration by fuel or other fluid is eliminated. The molded elements afford a most effective barrier to fluid penetration whether the fluid be fuel, water or air, because of the high density obtainable in their manufacture.

A seal built up by hand is subject to having pinholes, voids and bubbles formed therein. These flaws result in weak spots in the seal and leakage of fluid may result. The increased density characterizing seals utilizing preformed caps and fillets eliminates such hazards.

Less trouble is had, in the present method, with sealants which have a tendency to slump or run off since a lesser number of coats need be formed of the material, the thickness of the preformed elements substituting for the sealant.

There is little likelihood that any air would be entrapped within a cap because of the presence of an escape opening for the adhesive whereby an excessive amount of sealant may be included to assure complete filling of the space separating the cap from a fastener. However, if in some manner a bubble might be included it will have no effect on the seal since the inherent strength of the cap will serve to contain the bubble under all conditions of operation and there would be no bursting of a seal.

A seal constructed in accordance with the present invention has been found to have capacity to absorb the stresses and strains developed by expansion and contraction of an integral fuel tank and the other usual flexing movements thereof. Its effectiveness is maintained under all usual conditions of operation.

While a preferred embodiment of the present invention has been shown and described, variations will be readily apparent to those skilled in the art, and the means and method of sealing herein disclosed for effecting a leak-proof fuel container are to be limited only as set forth in the appended claims.

What I claim is:

1. A fluid tight seal construction for mechanically secured structural elements comprising a sealing layer of synthetic rubber-like material, a preformed element formed of synthetic rubber-like material positioned over said sealing layer and having a shape determined by the configuration of the structural elements at a juncture to be sealed, and a sealing coat of synthetic rubber-like material disposed over and enclosing said preformed element, all adhered together.

2. A fluid tight seal construction for mechanically secured structural elements comprising a sealing layer of synthetic rubber-like material, a preformed element formed of synthetic rubber-like material of the same composition as the material of said sealing layer positioned over said sealing layer and having a shape determined by the configuration of the structural elements at a juncture to be sealed, and a sealing coat of synthetic rubber-like material disposed over and enclosing said preformed element, the composition of the material of said sealing coat being the same as that of the material of the sealing layer and the preformed element, said sealing layer, preformed element and sealing coat being all adhered together to form a homogeneous construction.

3. A sealing construction for a mechanical fastener securing structural members in assembled relation comprising a sealing layer of synthetic rubber-like material disposed over an end of said mechanical fastener projecting from said assembled structural members, a preformed cap of synthetic rubber-like material enclosing said projecting end, and a coating of synthetic rubber-like material completely enveloping said preformed cap, all adhered together.

4. A sealing construction for a mechanical fastener securing structural members in assembled relation comprising a sealing layer of synthetic rubber-like material disposed over an end of said mechanical fastener projecting from said assembled structural members, a preformed cap of synthetic rubber-like material enclosing said projecting end, and a coating of synthetic rubber-like material completely enveloping said preformed cap, the synthetic rubber-like material comprising said sealing layer, preformed cap and coating being of the same composition, said sealing layer, preformed cap and coating being all adhered together into a homogeneous construction.

5. A sealing construction for a mechanical fastener securing structural members in assembled relation comprising a sealing layer of synthetic rubber-like material disposed over an end of said mechanical fastener projecting from said assembled structural members, a preformed cap of synthetic rubber-like material enclosing said projecting end, said preformed cap having its defining walls spaced from said projecting end, synthetic rubber-like material completely filling the space between the cap walls and said projecting end, and a coating of synthetic rubber-like material completely enveloping said preformed cap.

6. A sealing construction for a mechanical fastener securing structural members in assembled relation comprising a sealing layer of synthetic rubber-like material disposed over an end of said mechanical fastener projecting from said assembled structural members, a preformed cap of synthetic rubber-like material enclosing said projecting end, said preformed cap having an opening in the top thereof and having its defining walls spaced from said projecting end, synthetic rubber-like material filling the opening in the cap and the space between said defining walls and said projecting end, and a coating of synthetic rubber-like material enveloping said preformed cap, the synthetic rubber-like material comprising said sealing layer, preformed cap, filling and coating being of the same composition, said sealing layer, preformed cap and coating being all adhered together into a homogeneous construction.

7. In a liquid fuel container, a seal construction for a mechanical fastener securing structural elements of the container in assembled relation comprising a sealing layer of fuel resistant synthetic rubber disposed over an end of said mechanical fastener positioned within said container, a preformed cap of synthetic rubber enclosing said projecting end, and a coating of synthetic rubber completely enveloping said preformed cap, the synthetic rubber comprising said sealing layer, preformed cap and coating being of the same composition, said sealing layer, preformed cap and coating being all adhered together into a homogeneous construction.

8. In a liquid fuel container, a seal construction for a mechanical fastener securing structural elements of the container in assembled relation comprising a sealing layer of fuel resistant synthetic rubber disposed over an end of said mechanical fastener positioned within said container, a preformed cap of synthetic rubber enclosing said projecting end, said preformed cap having an opening in the top thereof and having its defining walls spaced from said projecting end, fuel resistant synthetic rubber filling the opening in the cap and the space between said defining walls and said projecting end, and a coating of synthetic rubber enveloping said preformed cap, the fuel resistant synthetic rubber comprising said sealing layer, preformed cap, filling and coating being of the same composition, said sealing layer, preformed cap, filling and coating being all adhered together into a homogeneous construction.

References Cited in the file of this patent

UNITED STATES PATENTS

| | | |
|---|---|---|
| 1,013,291 | Gilmore | Jan. 2, 1912 |
| 1,599,110 | Baldwin | Sept. 7, 1926 |
| 1,599,549 | Baldwin | Sept. 14, 1926 |
| 1,789,642 | Wirth | Jan. 20, 1931 |
| 1,955,816 | Lemont | Apr. 24, 1934 |
| 2,364,775 | Brice | Dec. 12, 1944 |
| 2,409,759 | Hosking | Oct. 22, 1946 |
| 2,508,906 | Cunningham et al. | May 23, 1950 |
| 2,563,113 | Hindin et al. | Aug. 7, 1951 |

FOREIGN PATENTS

| | | |
|---|---|---|
| 12,655 | Denmark | Oct. 19, 1909 |
| 605,478 | France | Feb. 19, 1926 |